United States Patent [19]
Kim

[11] Patent Number: 6,034,673
[45] Date of Patent: Mar. 7, 2000

[54] INFORMATION DISPLAY DEVICE AND PROCESS FOR VIDEO DISPLAY EQUIPMENT USING CODES CORRESPONDING TO FONT DATA

[75] Inventor: Byoung-Han Kim, Suwon, Rep. of Korea

[73] Assignee: SamSung Electronics Co., Ltd., Suwon, Rep. of Korea

[21] Appl. No.: 08/907,341

[22] Filed: Aug. 6, 1997

[30] Foreign Application Priority Data

Aug. 6, 1996 [KR] Rep. of Korea ............... 96/32746

[51] Int. Cl.[7] ............................................. G09G 5/24
[52] U.S. Cl. ........................ 345/195; 345/471; 348/563
[58] Field of Search ........................ 345/141, 149, 345/150, 192–195, 467–469, 144, 470–472; 348/563, 564, 569, 570, 141, 149, 150, 192–195, 467–469, 144, 470–472

[56] References Cited

U.S. PATENT DOCUMENTS

| | | |
|---|---|---|
| 4,568,981 | 2/1986 | Beaulier . |
| 4,763,118 | 8/1988 | Takai . |
| 4,837,729 | 6/1989 | Funahashi . |
| 4,937,565 | 6/1990 | Suwannukul . |
| 4,954,979 | 9/1990 | Eibner et al. . |
| 5,208,908 | 5/1993 | Harrison et al. . |
| 5,231,383 | 7/1993 | Diepstraten et al. . |
| 5,293,587 | 3/1994 | Deb et al. ................ 345/508 |
| 5,299,010 | 3/1994 | Nakazawa et al. ........ 348/731 |
| 5,311,213 | 5/1994 | Kosugi . |
| 5,339,160 | 8/1994 | Shindou ................ 345/509 |
| 5,343,307 | 8/1994 | Mizuno et al. . |
| 5,396,297 | 3/1995 | Shindou et al. .......... 345/569 |
| 5,457,473 | 10/1995 | Arai et al. . |
| 5,475,808 | 12/1995 | Kobayashi .............. 345/467 |
| 5,486,842 | 1/1996 | Kim . |
| 5,493,340 | 2/1996 | Kim . |
| 5,537,517 | 7/1996 | Wakabayashi et al. .... 345/515 |
| 5,539,428 | 7/1996 | Bril et al. . |
| 5,623,316 | 4/1997 | Maito et al. ............. 345/569 |
| 5,625,467 | 4/1997 | Kurokawa ............... 345/467 |
| 5,627,564 | 5/1997 | Yang . |
| 5,712,663 | 1/1998 | Matsumoto .............. 345/195 |

*Primary Examiner*—Ulka J. Chauhan
*Attorney, Agent, or Firm*—Robert E. Bushnell, Esq.

[57] ABSTRACT

An information display device for video display equipment comprises a memory for storing predetermined codes and attribute data of information to be displayed on a screen of the video display equipment; and an information display unit coupled to the memory for receiving desired ones of the predetermined codes and attribute data from the memory, decoding the received code, generating font data in accordance with the decoded result and adjusting an attribute of the generated font data in response to the received attribute data. Information display unit includes a controller for controlling a read operation of the memory, a display register for storing the desired codes from the memory under the control of the controller, an attribute register for storing the desired attribute data from the memory under the control of the controller; a font decoder for decoding the codes stored in the display register, and a font cell array including a plurality of font cells being selectively made active in response to output signals from the font decoder to generate the font data with the attribute adjusted in response to the attribute data stored in the attribute register.

8 Claims, 2 Drawing Sheets

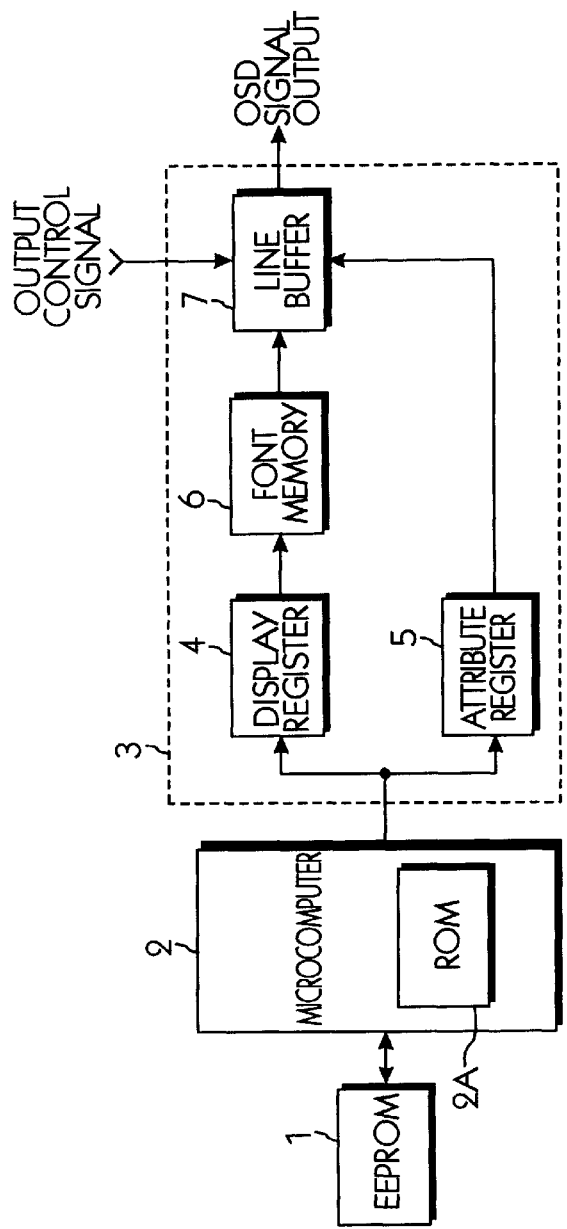
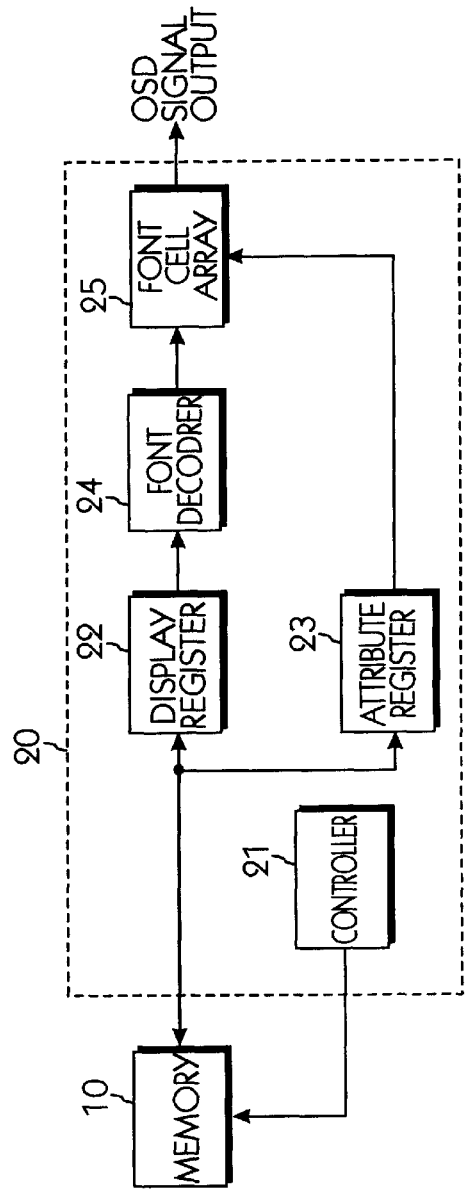
Fig. 1
Fig. 3

INFORMATION DISPLAY DEVICE AND PROCESS FOR VIDEO DISPLAY EQUIPMENT USING CODES CORRESPONDING TO FONT DATA

CLAIM FOR PRIORITY

This application makes reference to, incorporates the same herein, and claims all benefits accruing under 35 U.S.C. §119 from an application for INFORMATION DISPLAY DEVICE FOR VIDEO DISPLAY EQUIPMENT earlier filed in the Korean Industrial Property Office on the $6^{th}$ of Aug., 1996, and there duly assigned Serial No. 32746/1996, a copy of which application is annexed hereto.

BACKGROUND OF THE INVENTION

1. Technical Field

The present invention relates to video display equipment such as a television receiver, a monitor, and more particularly, relates to an information display device for the video display equipment which displays information such as a character, a numeral and a symbol on a screen of the video display equipment.

2. Related Art

Generally, video display equipment such as monitors and television receivers are adapted to display desired information on their screens to inform users of current operation states. For example, when the volume and channel are adjusted in television receivers in accordance with the user's operation, information data such as the set volume, the previously set channel and the current channel are displayed on the screen. Similarly, when the horizontal and vertical sizes, horizontal and vertical positions, brightness and clearness levels are adjusted in monitors in accordance with the user's operation as disclosed, for example, in U.S. Pat. No. 5,457,473 for Image Display Apparatus issued to Arai et al., adjusted values are displayed on the screen to inform the user of current operational states.

Typical video display equipment includes an on-screen display (OSD) unit for displaying the desired information on the screen. Examples of contemporary video display equipments using OSD units are disclosed in U.S. Pat. No. 5,343,307 for On-Screen Display Apparatus issued to Mizuno et al., U.S. Pat. No. 5,486,842 for On-Screen Display Circuit Of The Interlaced Scanning Type issued to Kim, U.S. Pat. No. 5,493,340 for Circuit For Displaying Screen Control States Of A Monitor issued to Kim, and U.S. Pat. No. 5,627,564 for Graphic On-Screen Display Method issued to Yang. Conventional OSD unit generally includes a data memory for storing character data and a font memory for storing font data corresponding to the character data to be displayed on the screen of the video display equipment. Font memory can be random-access memory (RAM) or read-only-memory as disclosed, for example, in U.S. Pat. No. 4,763,118 for Graphic Display System For Personal Computer issued to Takai, U.S. Pat. No. 4,837,729 for Display Apparatus for Simultaneous Display Of Lines Of Characters Having Different Line Pitches issued to Funahashi, U.S. Pat. No. 4,954,979 for Personal Computer With Multiple Independent CRT Displays Of Ideographic And/Or ASCII Characters Having Loadable Font Memory For Storing Digital Representations Of Subset Or Special Characters issued to Eibner et al., U.S. Pat. No. 4,937,565 for Character Generator-Based Graphics Apparatus issued to Sawannukul, U.S. Pat. No. 5,231,383 for Videographics Display System issued to Diepstraten et al., and U.S. Pat. No. 5,311,213 for Display Control Device issued to Kosugi.

Font memory is required, however, to store font data of all information to be displayed on the screen. For example, in the case where 256 information data is to be displayed on the screen and font data of 12×10 bits is required for each piece of information, the font memory must have a 12×10×256-bit capacity. This memory requirement, as I have observed, is burdensome and cost prohibitive.

SUMMARY OF THE INVENTION

Accordingly, it is therefore an object of the present invention to provide an improved information display device for a video display equipment.

It is also an object to provide an information display device for a video display equipment capable of generating font data using a code of information to be displayed on a screen without using a font memory.

It is another object of the present invention to provide an information display device for a video display equipment capable of appending a code to information to be displayed on a screen of the video display equipment and generating font data using the appended code.

These and other objects of the present invention can be achieved by an information display device for video display equipment which comprises a memory for storing predetermined codes and attribute data of information to be displayed on a screen of the video display equipment; and an information display unit coupled to the memory for receiving desired ones of the predetermined codes and attribute data from the memory, decoding the received code, generating font data in accordance with the decoded result and adjusting an attribute of the generated font data in response to the received attribute data.

Also, an information display unit includes a controller for controlling a read operation of the memory, a display register for storing the desired codes from the memory under the control of the controller, an attribute register for storing the desired attribute data from the memory under the control of the controller; a font decoder for decoding the codes stored in the display register, and a font cell array including a plurality of font cells being selectively made active in response to output signals from the font decoder to generate the font data with an attribute adjusted in response to the attribute data stored in the attribute register.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1 illustrates a contemporary information display device for a video display equipment;

FIG. 3 illustrates an information display device for a video display equipment constructed according to the principles of the present invention.

DETAILED DESCRIPTION OF THE PREFERRED EMBODIMENT

Figure 2:
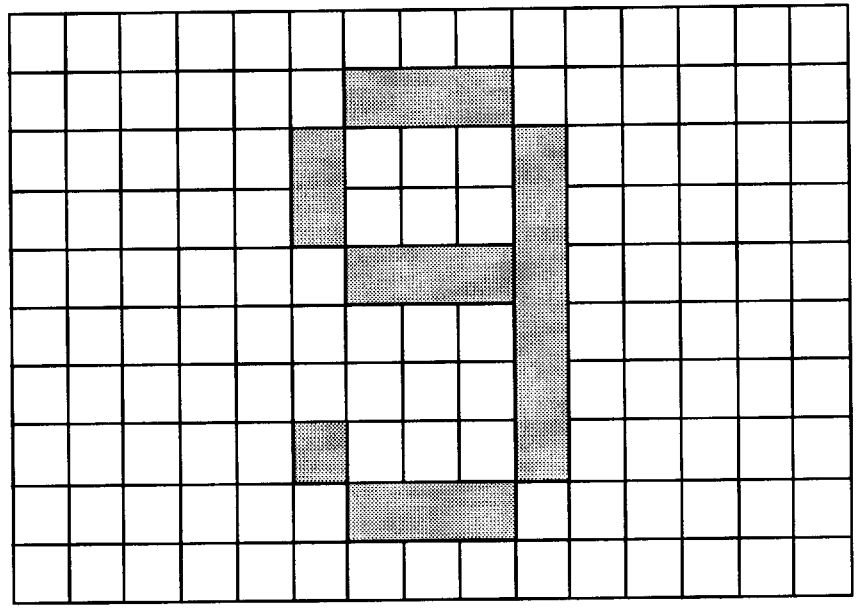
FIG. 2 illustrates font data stored in a font memory of the contemporary information display device as shown in FIG. 1.

Referring now to the drawings and particularly to FIG. 1, which illustrates an example of a contemporary information display device for providing a visual display of desired information on a screen of a video display equipment using an OSD unit. As shown in FIG. 1, the information display device includes an electrically erasable and programmable read only memory (EEPROM) 1 for storing data regarding movable information to be displayed on the screen of the video display equipment, and a micro-computer 2 for controlling operation of an OSD unit 3. If the video display equipment is a television receiver, for example, the EEPROM 1 stores addresses and attribute data relating movable information such as numerals and bar indicators indicative of volume values and numerals (for example, '2' and '3') indicative of selected channels. The micro-computer 2 includes a read-only-memory (ROM) 2A for storing data relating to fixed information. For example, in the television receiver, the ROM 2A stores addresses and attribute data regarding character information such as 'CH' and 'VOLUME' to be displayed on the screen.

The OSD unit 3 includes a display register 4 for temporarily storing an address in display information data from the micro-computer 2, an attribute register 5 for temporarily storing attribute data, such as a color, a size, etc., in the display information data from the microcomputer 2, a font memory 6 for pre-storing font data of information to be displayed on the screen and outputting the stored font data in response to the address stored in the display register 4, and a line buffer 7 for storing the font data from the font memory 6 and outputting the stored font data in response to the attribute data stored in the attribute register 5. In the font memory 6, the stored font data of each information to be displayed on the screen is composed of M×N bits in the unit of addresses, where M and N are natural numbers. Font data relating to, for example, numeral '9' as stored in the font memory 6 can be shown in FIG. 2.

In order to display desired information on the screen, the micro-computer 2 retrieves addresses and attribute data of the desired information from the EEPROM 1 and ROM 2A and outputs the retrieved addresses and attribute data to the OSD unit 3. For example, in the case where information 'CH 9' is to be displayed on the screen of the television receiver as a channel 9 is selected by the user, the micro-computer 2 retrieves addresses and attribute data regarding the information "C" and "H" from the ROM 2A and an address and attribute data regarding the information 9 from the EEPROM 1. The micro-computer 2 then outputs the retrieved addresses and attribute data to the OSD unit 3.

In the OSD unit 3, the display information addresses from the microcomputer 2 are stored in the display register 4, and the display information attribute data therefrom are stored in the attribute register 5. Then, the font memory 6 outputs font data corresponding to the addresses stored in the display register 4, which is then stored in the line buffer 7. For example, font data corresponding to the information 'C', 'H' and '9' are output from the font memory 6 in response to the addresses stored in the display register 4 and then stored in the line buffer 7. If an output control signal is generated, the font data stored in the line buffer 7 is applied to attributes (for example, a color, a size, etc.) in response to the attribute data stored in the attribute register 5. The output control signal is typically generated in response to horizontal and vertical synchronous signals to display the font data stored in the line buffer 7 on corresponding positions of the screen.

The conventional information display device has, however, a disadvantage in that the font memory 6 is required to store font data of all the information to be displayed on the screen. For example, in the case where 256 information data is to be displayed on the screen and font data of 12×10 bits is required for each piece of information, the font memory must have a 12×10×256-bit capacity. This large memory capacity requirement, as I have noted earlier, is burdensome and cost prohibitive.

Turning now to FIG. 3 which illustrates an information display device for a video display equipment constructed according to the principles of the present invention. As shown in FIG. 3, the information display device comprises a memory 10 for storing predetermined codes and attribute data of information to be displayed on a screen of the video display equipment. Preferably, the memory 10 can be an EEPROM. An information display unit 20 is coupled to receive desired ones of the codes and attribute data from the memory 10, for decoding the received code, generating font data in accordance with the decoded result and adjusting an attribute of the generated font data in response to the received attribute data.

Information display unit 20 includes a controller 21 for controlling a read operation of the memory 10, a display register 22 for storing the desired code from the memory 10 under the control of the controller 21, an attribute register 23 for storing the desired attribute data from the memory 10 under the control of the controller 21, a font decoder 24 for decoding the code stored in the display register 22, and a font cell array 25 including a plurality of font cells being selectively made active in response to output signals from the font decoder 24 to generate the font data with the attribute adjusted in response to the attribute data stored in the attribute register 23.

Figure 4:
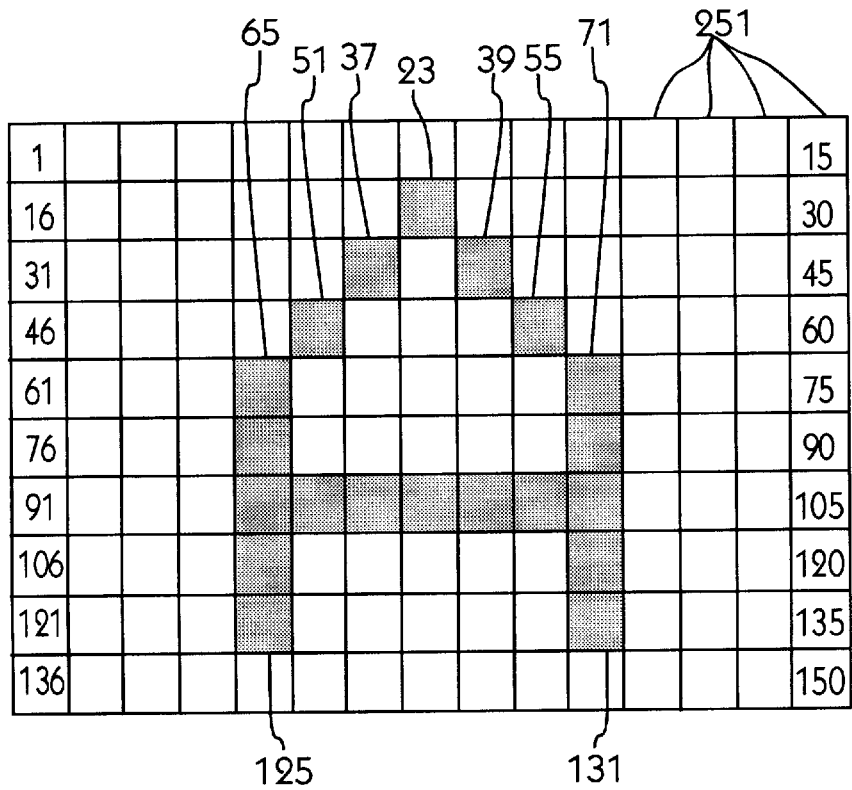
FIG. 4 illustrates an arranged state of font cells in a font cell array of the information display device as shown in FIG. 3.

Refer to FIG. 4 which illustrates an arranged state of the font cells in the font cell array 25 of the information display unit 20 as shown in FIG. 3, which are designated by the reference numeral 251. As shown in FIG. 4, the font cells 251 are vertically and horizontally arranged. Provided that the font data of the information to be displayed on the screen has an M×N size, the font cells 251 will be M×N in number.

The operation of the information display device constructed according to the principles of the present invention will now be described in detail with reference to FIGS. 3 and 4 hereinbelow.

In order to display desired information on the screen, the controller 21 in the information display unit 20 controls the memory 10 to transfer a code and attribute data of that information from the memory 10 respectively to the display register 22 and attribute register 23. As a result, the code from the memory 10 is stored in the display register 22, and the attribute data from the memory 10 is stored in the attribute register 23. Noticeably, the code stored in the display register 22 is used to allocate the information to be displayed on the screen, in the unit of font data. Then, the code stored in the display register 22 is decoded by the font decoder 24 and applied to the M×N font cells 251 in the font cell array 25 to selectively make them active. For example, in the case where the font data of the information to be displayed on the screen has a 15×10-bit capacity, the number of the font cells 251 in the font cell array 25 will be 15×10=150.

Assuming that the information to be displayed on the screen is an alphabet letter 'A' which is allocated with a code '0001'; the controller 21 controls the memory 10 to store the code '0001' from the memory 10 into the display register 22.

The font decoder 24 decodes the code '0001' stored in the display register 22 and outputs active signals respectively to the 23rd, 37th, 39th, 51st, 55th, 65th, 71st, 80th, 86th, 95th, 96th, 97th, 98th, 99th, 100th, 101st, 110th, 116th, 125th and 131st font cells 251 in the font cell array 25 in accordance with the decoded result.

As a result shown in FIG. 4, in response to the output signals from the font decoder 24, the 23rd, 37th, 39th, 51st, 55th, 65th, 71st, 80th, 86th, 95th, 96th, 97th, 98th, 99th, 100th, 101st, 110th, 116th, 125th and 131st font cells 251 in the font cell array 25 are made active and all the remaining font cells in the font cell array 25 are not made active, thereby causing the alphabet letter 'A' to be displayed on the screen. Then, if an output control signal is generated in response to horizontal and vertical synchronous signals, signals of the active font cells 251 in the font cell array 25 are outputted according to the attribute data stored in the attribute register 23 to display the alphabet letter 'A' on the screen.

As described above, the information display device constructed according to the principles of the present invention decodes a code of information, such as a character, a numeral and a symbol, to be displayed on the screen of the video display equipment and generates font data in accordance with the decoded result. Therefore, the information display device can advantageously display desired information on the screen without using a separate font memory.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An information display device for video display equipment, comprising:
    a memory for storing predetermined codes corresponding to font data and for storing attribute data of information to be displayed on a screen of said video display equipment; and
    information display means for selectively receiving a desired at least one of said predetermined codes corresponding to font data and for receiving desired attribute data from said memory for said information to be displayed on said screen, for decoding received said desired at least one of said predetermined codes, for generating font data corresponding to said desired at least one of said predetermined codes and for adjusting at least one attribute of generated font data corresponding to said desired at least one of said predetermined codes in response to received said desired attribute data, wherein said information display means comprises:
        a controller for controlling a read operation of said memory;
        a display register for storing the desired at least one of said predetermined codes from said memory under the control of said controller;
        an attribute register for storing the desired attribute data from said memory under the control of said controller;
        a font decoder for decoding the desired at least one of said predetermined codes stored in said display register; and
        a font cell array including a plurality of font cells selectively activated in response to output signals from said font decoder to generate font data corresponding to the desired at least one of said predetermined codes with at least one attribute adjusted in response to the desired attribute data stored in said attribute register.

2. The information display device as claimed in claim 1, wherein said plurality of font cells are determined in number according to a size of font data and are arranged vertically and horizontally.

3. The information display device as claimed in claim 1, wherein said memory comprises an electrically erasable and programmable read-only-memory.

4. An information display device for video display equipment, comprising:
    a memory for storing predetermined codes corresponding to font data and for storing attribute data corresponding to information to be displayed on a screen of said video display equipment;
    a display register connected to said memory;
    an attribute register connected to said memory;
    a controller for addressing said memory to selectively retrieve from said memory a desired at least one of said predetermined codes corresponding to font data for said information to be displayed on said screen for temporary storage of the desired at least one of said predetermined codes at said display register, and to retrieve desired attribute data from said memory corresponding to said information to be displayed on said screen for temporary storage of the desired attribute data at said attribute register;
    a font decoder for decoding the desired at least one of said predetermined codes corresponding to font data stored in said display register; and
    a font cell array having a plurality of font cells selectively activated in response to output signals from said font decoder to generate font data corresponding to the desired at least one of said predetermined codes with attribute data adjusted in response to the desired attribute data stored in said attribute register.

5. The information display device as claimed in claim 4, wherein said plurality of font cells are determined in number according to a size of font data and are arranged vertically and horizontally.

6. The information display device as claimed in claim 4, wherein said memory comprises an electrically erasable and programmable read-only-memory.

7. A process of processing character data to be displayed on a screen of video display equipment, said process comprising the steps of:
    storing in a memory coded characters corresponding to font data and attribute data relating to said character data to be displayed on the screen of said video display equipment;
    selectively retrieving from said memory a desired at least one of said coded characters corresponding to font data for said character data to be displayed on the screen for temporary storage in a display register;
    retrieving desired attribute data corresponding to said character data to be displayed on the screen from said memory for temporary storage in an attribute register;

decoding the desired at least one of said coded characters stored in said display register to produce font data corresponding to said character data to be displayed on the screen; and activating selected ones of a plurality of font cells arranged in a font cell array in response to the decoded desired at least one of said coded characters to generate corresponding font data with attribute data adjusted in response to the desired attribute data stored in said attribute register to display said character data on said screen.

8. The method as claimed in claim 7, wherein said memory comprises an electrically erasable and programmable read-only-memory.

* * * * *